United States Patent
Pauli et al.

(10) Patent No.: US 7,270,116 B2
(45) Date of Patent: Sep. 18, 2007

(54) METHOD FOR DIAGNOSING VARIABLE INTAKE SYSTEM

(75) Inventors: Joakim Pauli, Torslanda (SE); Anders Lingenhult, Gothenburg (SE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 11/266,648

(22) Filed: Nov. 3, 2005

(65) Prior Publication Data
US 2006/0096581 A1    May 11, 2006

(30) Foreign Application Priority Data
Nov. 5, 2004    (EP) .................................. 04026240

(51) Int. Cl.
  *F02M 51/00*    (2006.01)
  *G06F 19/00*    (2006.01)
  *F01L 1/34*    (2006.01)
(52) U.S. Cl. ..................... 123/480; 123/90.15; 701/114
(58) Field of Classification Search ................ 701/102, 701/103, 104, 108, 114; 123/320, 323, 324, 123/531, 532, 533
See application file for complete search history.

(56) References Cited

U.S. PATENT DOCUMENTS

| | | | |
|---|---|---|---|
| 5,138,874 A | | 8/1992 | Davis |
| 5,201,296 A | * | 4/1993 | Wunning et al. ............ 123/479 |
| 6,640,543 B1 | * | 11/2003 | Seal ............................. 60/609 |
| 6,807,938 B2 | * | 10/2004 | Majewski et al. .......... 123/320 |

* cited by examiner

*Primary Examiner*—Stephen K. Cronin
*Assistant Examiner*—Johnny H. Hoang
(74) *Attorney, Agent, or Firm*—Julia Voutyras; Allan J. Lippa

(57) ABSTRACT

An internal combustion engine comprises an engine controller (ECU) governing fuel supply to the combustion engine by a fuelling map, which adapts the amount of fuel supplied to the engine responsive to engine speed, engine load and a volumetric efficiency of the engine. A variable intake system with at least one valve changes an effective tuning length of said variable intake system wherein degradation of said variable intake system can be diagnosed by comparing a calculated pressure variation of an inlet pressure of said variable intake system with a predetermined value for the pressure variation. The engine controller (ECU) adapts the fuelling map responsive to the diagnosis of degradation of the at least one valve of the variable intake system.

4 Claims, 3 Drawing Sheets

METHOD FOR DIAGNOSING VARIABLE INTAKE SYSTEM

FIELD OF THE INVENTION

The present invention relates to a method for reducing an emission increase from an internal combustion engine in case of degradation of a variable intake system, and more particularly to adapting engine fuelling in response such degradation.

BACKGROUND AND SUMMARY OF THE INVENTION

It is known to increase power output and torque from combustion engines by using "tuned" intake systems. Such intake systems use the inertia of air that is about to get inducted by the engine in order to increase the volumetric efficiency of the engine, i.e., the amount of air that is inducted in to the engine cylinders for each engine cycle. One drawback with tuned exhaust systems is however that the tuning effect is limited to a rather narrow engine speed range; more efficient tuning leads to an even narrower engine speed range with working tuning. Moreover, tuning of an engine in a specific speed range actually lowers the engines volumetric efficiency outside this speed range.

In a tuned intake system, the intake valves induct air through a "pipe". As is well known by persons skilled in the art, a suction wave that meets a thinner medium is reflected as a pressure wave (and vice versa, a pressure wave is reflected as a suction wave). A thinner medium is in this context a pipe with a larger diameter. As also is well known by people skilled in the art, induction of air into the cylinder results in a suction wave; as this suction wave meets a thinner medium, i.e. a diameter increase at the end of the pipe, it will be reflected as a pressure wave. In a properly tuned intake system, the pressure wave should reach the intake valves just before they close, and in that way press in an extra amount of air into the cylinder. As can be understood, and as stated above, this type of tuning only works in a narrow engine speed range; if the engine speed is too high, the pressure wave will not reach the intake valve in time; if it is too low, the extra air that is pressed into the cylinder by the pressure wave will have time to escape back through the open intake valves. As mentioned, one problem with tuned intake systems is that they actually decrease the engines volumetric efficiency outside the specified engine speed range, which will render the engine torque as a function of engine speed uneven. The more efficient the tuning, the narrower the tuned engine speed range, and the worse the engines volumetric efficiency will be outside the tuned speed range.

In order to avoid the above problems, variable intake systems have been developed. On such intake systems, it is possible to vary the effective length of the intake pipe. This is mostly done by a valve that punctures the intake "pipe" in order to shorten the effective length, i.e. the length from the intake valve of the engine to the thinner medium. Such systems are well known by persons skilled in the art, and function well to give engines smooth running characteristics over a wide engine speed range.

Inventors herein have recognized a problem concerning the combination of variable intake systems and engines comprising electronically controlled fuel injection systems; such fuel injection systems rely on a "fuelling map" that controls the amount of injected fuel based on information on intake manifold pressure, engine speed and the volumetric efficiency of the engine. If the volumetric efficiency of the engine is not what is expected in the fuelling map, an emission increase will result. This is due to the effect that valve degradation may affect the amount of air inducted to the engine, compared to what would be the case if the valve would function properly; this "fools" the engine controller to inject an amount of fuel that either leads to a too "lean" or to a too "rich" combustion (lean and rich combustion is engine jargon for air/fuel mixtures that contain too small or too large amounts of fuel, compared to the amount of air that is needed for a complete combustion).

For steady state conditions, the amount of injected fuel is "fine-tuned" by information from an oxygen sensor in the exhaust system, but for transient load conditions, there will be an emission increase (steady state means that the engine runs on the same speed and load for an extended period of time—transient means that the engines speed and/or load changes).

Therefore, it is important to diagnose degradation in such systems, and to minimize emissions increase due to the degradation.

U.S. Pat. No. 5,138,874 describes a diagnosis system for an engine comprising an intake system with reed valves. The diagnosis system comprises a pressure sensor placed in the intake system, which pressure sensor is connected to an engine controller. The engine controller takes samples of the pressure in the intake system as a function of crank angle degree, (CAD); if the pressure fluctuations, i.e. the pressure variations, would exceed a certain value, the engine controller is informed that any of the reed valves is defect. As a reaction to the information, the ECU informs the driver about the reed valve degradation.

However, U.S. Pat. No. 5,138,874 does not describe a reliable method for calculating the pressure fluctuation level without taking samples of the pressure as a function of CAD. This is probably due to the fact that a failing reed valve gives so large pressure fluctuation that a more sophisticated calculation method is not needed. For more normal intake systems, i.e., intake systems without reed valves, the method according to U.S. Pat. No. 5,138,874 is not sufficient.

Another drawback with the invention described in U.S. Pat. No. 5,138,874 is that the method described therein requires a lot of processor power; taking pressure samples as a function of CAD means much more work for the processor comprised in the engine controller, ECU.

Moreover, U.S. Pat. No. 5,138,874 fails to describe how to minimize emissions in case of a reed valve degradation.

The present invention is aimed to solve the problem with the increased emissions that results from degraded intake system. The invention also aims to solve the problem with diagnosis of intake system degradation, without increasing the demands on processor capacity in the engine controller, ECU, unnecessarily much.

The above problems are solved by an internal combustion engine, wherein an engine controller adapts a fuelling map responsive to diagnosis of degradation of at least one valve of the variable intake system.

It is beneficial if a pressure sensor is placed in an intake plenum feeding one cylinder bank in an engine of V-configuration, since tests have shown that this position gives a large pressure variation difference.

Further, it is beneficial if the variable intake system comprises two separate intake plenums which are separated by a partitioning wall, that merges into a secondary pipe and are interconnected by at least one butterfly valve.

It is also beneficial if a pressure sensor is placed in either of the intake plenums, since it is unnecessary to use more than one pressure sensor.

The above advantages and other advantages, and features of the present invention will be readily apparent from the following detailed description of the preferred embodiments when taken in connection with the accompanying drawings, and from the claims.

BRIEF DESCRIPTION OF THE DRAWINGS

The advantages described herein will be more fully understood by reading an example of an embodiment in which the invention is used to advantage, referred to herein as the Description of Preferred Embodiment, with reference to the drawings, wherein.

DESCRIPTION OF PREFERRED EMBODIMENT(S)

Figure 1:
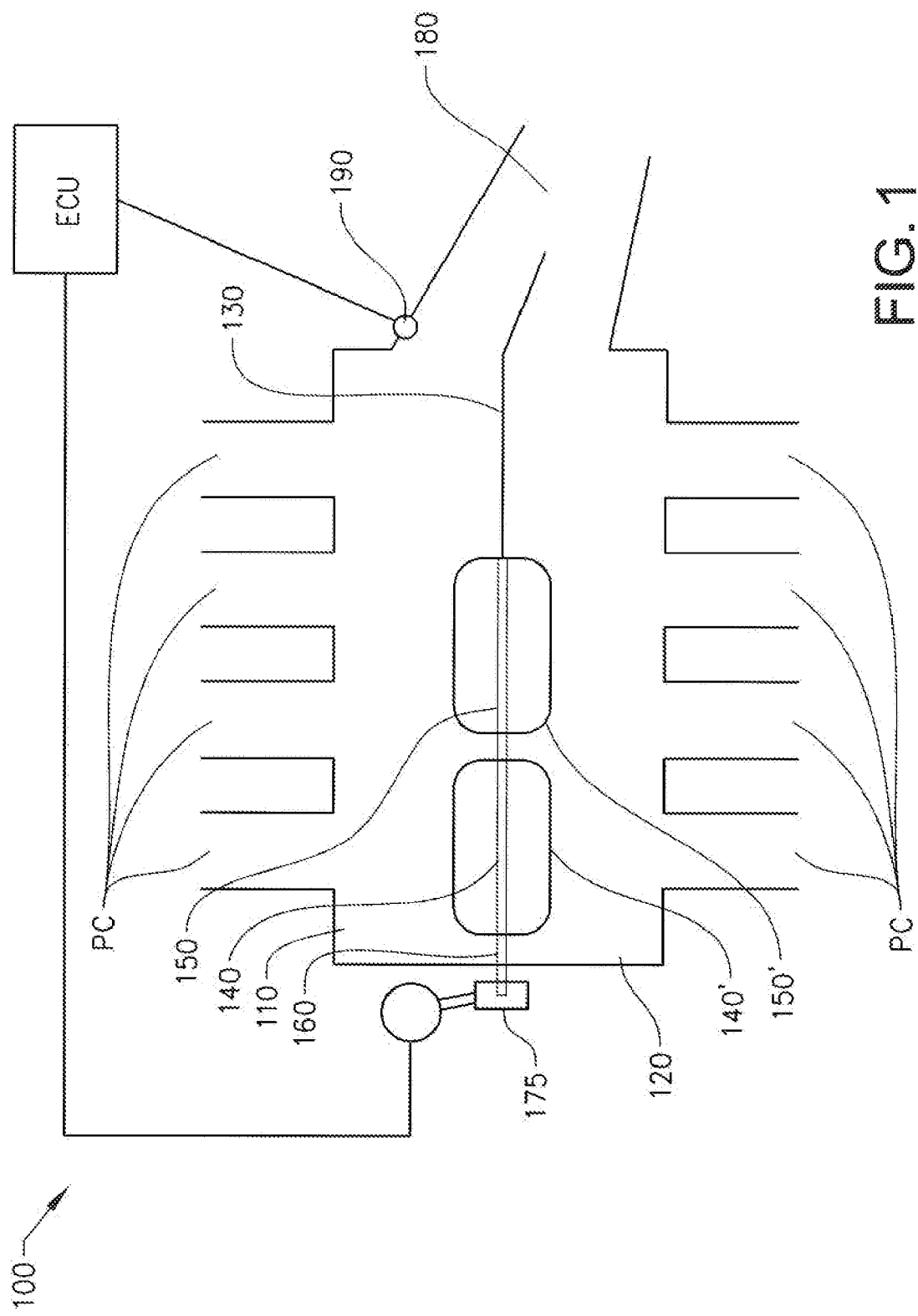
FIG. 1 is a schematic view of a V8 engine intake system according to the present invention.

In FIG. 1, a schematic variable intake system 100 is shown, which comprises eight primary channels PC, each of which being connected to an engine cylinder (not shown), wherein the eight cylinders are arranged in a V8 configuration, in a way that is well understood by a person skilled in the art. The intake system 100 further comprises two intake plenums 110 and 120, which are separated by a partitioning wall 130. There are two openings 140 and 150 in the partitioning wall 130, which openings can be opened or closed by means of two butterfly valves 140' and 150', respectively. The valves 140' and 150' can of course be of any type. A generally accepted term for such valves is Intake Manifold Transition Valves (IMTV). In the following, the valves 140' and 150' will however be referred to as butterfly valves. Both of the butterfly valves 140' and 150' are connected to a common control shaft 160, which is connected to an actuator 170, e.g. a vacuum actuator, which can open and close the butterfly valves by imparting a rotational motion to the control shaft 160. The intake plenums 110 and 120 are merging into a common, secondary pipe 180. Further, a pressure sensor 190 is placed in either of the intake plenums 110 or 120. The pressure sensor is connected to an engine controller ECU, and senses the inlet pressure in either of the intake plenums 110 or 120. As can be understood, and as is well known by persons skilled in the art, the ECU is further connected to controllable engine components like spark plugs (not shown), fuel injectors (not shown), fuel pumps (not shown), Variable Valve Timing (VVT) mechanisms (if the engine comprises such features, not shown), and the actuator 170, for control of the opening/closing of the butterfly valves 140' and 150'.

As described in the prior art section, tuning of an intake system can give a higher torque, since the volumetric efficiency, i.e., the amount of air inducted into each cylinder per engine cycle, increases with a correct tuning of the intake. For the engine with the variable intake according to the present invention, experiments have shown that the engine, for maximum torque, should be run with the valves 140' and 150' open at engine speeds under 1600 revolutions per minute (rpm) and over 3100 rpm. Between 1600 rpm and 3100 rpm, the engine should run with closed valves 140' and 150'.

As mentioned before, there is a scheme, often referred to as a "fuelling map" stored in the ECU. The fuelling map is a rough estimate of how much fuel that should be injected in the engine as a function of engine load and speed. The fuelling map takes the volumetric efficiency into account in the prediction of how much fuel that should be injected. If the volumetric efficiency is not what it is expected to be, for example in the case that either of the two butterfly valves 140' or 150', or both, is in a position they are not expected to be, the fuelling map will not inject the correct amount of fuel, which may lead to increased emissions. If the volumetric efficiency is higher than expected, the emissions of nitrogen oxides, NOx, will increase, since combustion with excess air will produce exhausts with a surplus of oxygen, which will render conversion of NOx in the catalyst inefficient. In the opposite case, if the volumetric efficiency is lower than expected, the emissions of unburned hydrocarbons (uHC) and carbon monoxide (CO) will increase.

According to the invention, it is possible for the ECU to change between different fuelling maps for various degradation modes of the variable intake system; it is also possible to let the ECU change back to a normal mode, if the diagnostic system detects for example that a valve that previously was stuck again functions in the proper way.

Most engines further comprise a "lambda" sensor, which is placed in the exhaust system and informs the ECU whether the engine is run on an air/fuel mixture that is either too lean (more air than is needed to combust all fuel) or to fuel rich (more fuel than is needed to consume all oxygen). The information from the lambda sensor can however only be used at "steady state" conditions, i.e. where the engines speed and load is unchanged for an extended period of time. At transient conditions, the governing of the fuel injected into the engine relies primarily on information from the fuelling map.

In order to diagnose whether the butterfly valves 140' and 150' follow the control signals from the ECU, hence giving the ECU the correct assumption regarding the volumetric efficiency of the engine, the pressure sensor 190 measures the pressure in either of the two intake plenums 110 or 120. In one embodiment of the invention, the pressure is measured every fourth millisecond, i.e., with a rate of 250 Hz. The pressure signal is processed in the following manner;

In a first step, the raw signal from the pressure sensor is low-pass filtered; this can be done either digitally, in the engine ECU, or analogically by letting the pressure signal pass through an inductance (optionally, the pressure signal can also be "short-circuited" by a capacitor).

In a second step, the low-pass filtered pressure signal is subtracted from the "raw", unprocessed, pressure signal.

In a third step, a calculation of the pressure variation is performed by addition of the absolute value of a number of raw pressure samples subtracted by the low-pass filtered signal.

In a fourth step, the calculated value of the pressure variation is compared to an expected value for the pressure variation. This value depends on whether the butterfly valves 140' and 150' are open or closed, on the inlet pressure and on the engine speed. The expected value is however always higher if the butterfly valves are closed.

By comparing the measured value for the pressure variation signal with the expected value, it can be concluded whether the variable intake system functions properly.

Figure 2:
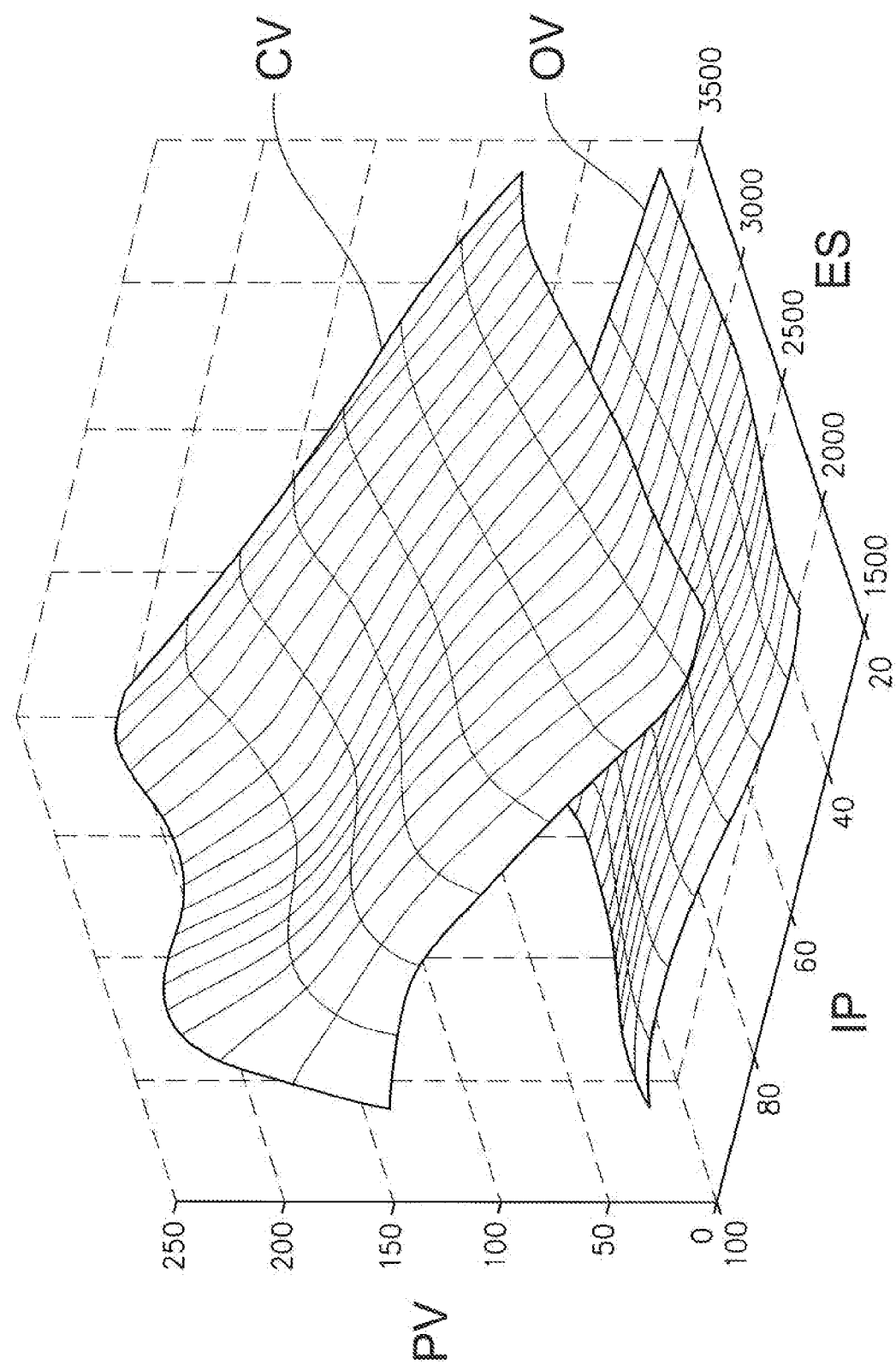
FIG. 2 is a surface diagram showing pressure variance as a function of engine speed and manifold pressure for open and closed intake system valves and FIG. 3 is a block scheme representing steps included in the method for reducing emissions, according to the present invention.

In FIG. 2, pressure variation values (PV) with open butterfly valves (OV) and closed butterfly valves (CV) are shown as a function of engine speed (ES) and intake pressure (IP), in a three dimensional plot. It should be noted that the pressure variation values are arbitrary, whereas the units on the engine speed axis and the intake pressure axis are revolutions per minute and kilopascal, respectively. As can be seen, the pressure variation value is always higher for the closed butterfly valves.

This knowledge makes it possible to inform the ECU if it would turn out that either of the butterfly valves would not function properly, since the ECU "knows" which pressure variance that can be expected for each engine speed, intake pressure and volumetric efficiency, if the butterfly valves function correctly. The ECU can thus also decide whether any or both of the butterfly valves has/have stuck in either an open or a closed position, which results in a deviation in expected pressure variation.

Figure 3:
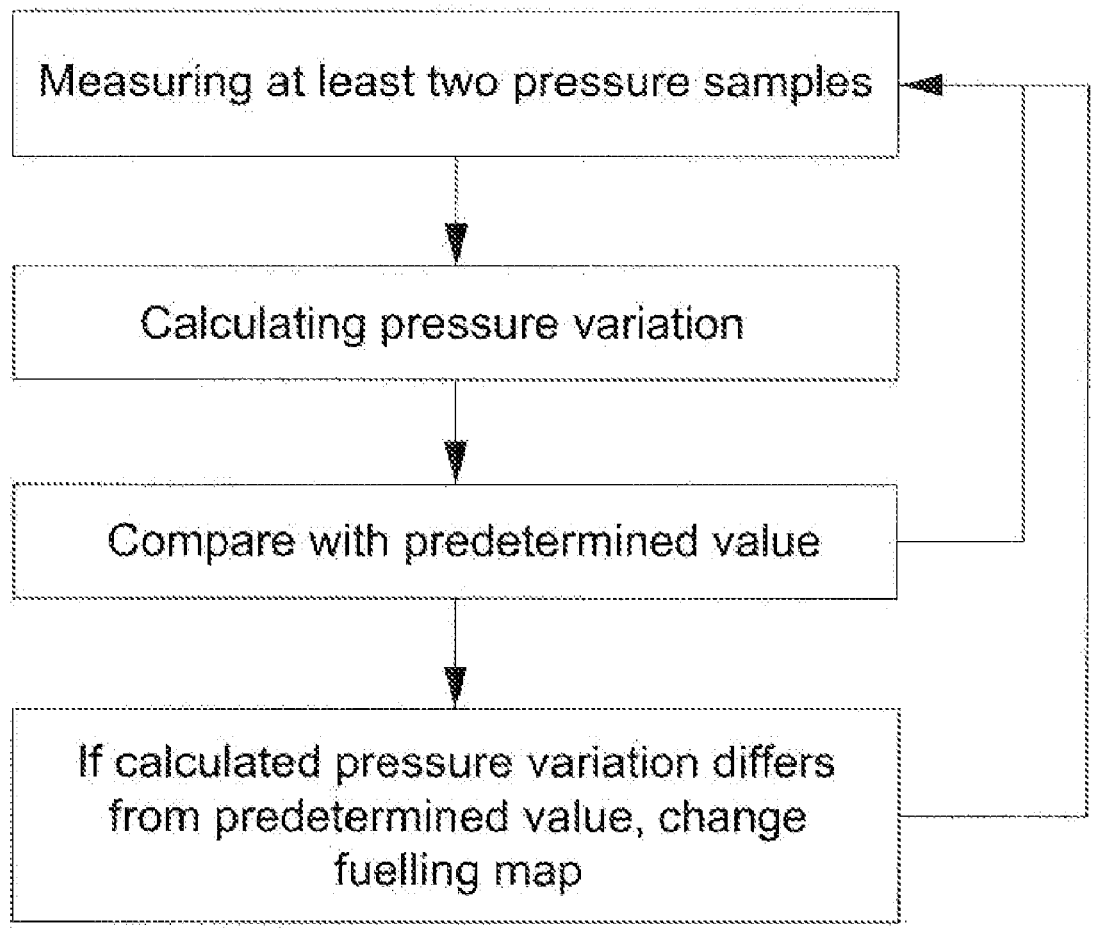

The steps comprised in the method according to the invention are shown in FIG. 3.

If the ECU is informed about a butterfly being stuck in any position, it can take either of two measures; in a first embodiment, it could inform the driver that something is wrong by flashing a malfunction indication lamp (MIL) and/or sounding a beeper; in a second embodiment, which is preferred and shown as the last step in FIG. 3, the ECU switches to a fuelling map that suites the new volumetric efficiency of the engine. In this way, degradation of either of the butterfly valves will not lead to increased emissions; the only thing that will happen is that the engines maximum output power decreases. For the second embodiment, it is however beneficial if butterfly valve degradation will be communicated to the "diagnostic box" that often is used at auto shops. By such communication, the auto shop can fix the degraded valve as the car is in for service or maintenance.

The pressure variation calculation according to the present invention make it possible to detect several degradation modes of the IMTV:s; for example, if they are semi-open when they are supposed to be fully opened, if they are semi-closed as they are supposed to be fully closed, or if they are stuck in either an open or closed position. In the last case, the ECU preferably switches between a "normal" fuelling map and a fuelling map for degraded mode, depending on engine speed.

Furthermore, the pressure variation calculation offers a fool-proof method of determining valve degradation; if, for example, an IMTV is not fully closed, it might be enough closed to increase the pressure variation in either of the intake plenums; such a condition will not produce an error signal, which is beneficial; since pressure variations is a measure of the tuning of the intake, tuning will work regardless of the non-closure of the IMTV.

Regarding the position of the pressure sensor, experiments have shown that it is preferred to place the pressure sensor 190 in either of the intake plenums 110 or 120, preferably on a distance from the secondary pipe 180; by keeping the pressure sensor away from the close vicinity of the secondary pipe 180, "leakage" of pressure pulses from the "other" intake plenum, i.e. the intake plenum without pressure sensor, to the pressure sensor is avoided. Of course, it is possible to place pressure sensors in both intake plenums 110, 120, but this has been considered unnecessarily expensive.

Above, the invention has been described with reference to some of the preferred embodiments; it is however obvious for persons skilled in the art that many diversions from the described embodiments can be made without departing from the scope of the invention. For example, the described method for calculating the variation of the inlet pressure can be changed to any other suitable method; examples of such methods are calculation of the Root Mean Square (RMS) value, which is a method that is well known by persons skilled in the art.

Further, the engine of the preferred embodiment comprises eight cylinders, arranged in a V-configuration. It is however nothing that excludes that the invention can be used on engines comprising, e.g., two, three, four, five, six, ten twelve or eighteen cylinder s, wherein the cylinders can be arranged in various configurations, e.g., inline, V, W, boxer or radial configuration. These cylinder configurations are well known by persons skilled in the art, and are well described in the literature. As can be understood, the positioning of IMTV:s, and pressure sensors may differ significantly from the embodiment described herein; for inline engines, the IMTV would most likely be placed between two inlet plenums supplying air/fuel mixture (or for CI engines, air only) to for example cylinders number 1 to n/2 and cylinder numbers (n/2+1) to n respectively, wherein n equals the number of cylinders.

Above, the invention has been disclosed for use with a variable intake system having two "effective lengths" of the intake system. It is however nothing that excludes that the present invention could be used for variable intake systems having more than two "effective lengths", e.g., three effective lengths.

This concludes the description of the invention. The reading of it by those skilled in the art would bring to mind many alterations and modifications without departing from the spirit and the scope of the invention. Accordingly, it is intended that the scope of the invention be defined by the following claims:

The invention claimed is:

1. A system for reducing an emission increase from an internal combustion engine, comprising:
    a variable intake system for the internal combustion engine, comprising two separate intake plenums, which are separated by a partitioning wall, merging into a secondary pipe and interconnected by at least one intake manifold transition valve; and
    a controller governing fuel supply to the engine by a fuelling map which adapts an amount of fuel supplied based on operating conditions, said controller further diagnosing degradation of said variable intake system by comparing a calculated pressure variation of an inlet pressure of said variable intake system with a predetermined value for the pressure variation, and adapting said fuelling map based on said diagnosis of degradation.

2. The system according to claim 1, wherein a pressure sensor is placed in either of the intake plenums.

3. The system according to claim 2, wherein the internal combustion engine is a V8-engine.

4. The system according to claim 3, wherein said engine is a six cylinder inline engine.

* * * * *